Feb. 9, 1932.    P. BILLIGMANN    1,844,555
ADJUSTABLE BEARING FOR ROLL STRAIGHTENING MACHINES
Filed Jan. 23, 1925    2 Sheets-Sheet 1

Inventor
P. Billigmann
by
W. E. Emery
Attorney.

Feb. 9, 1932.    P. BILLIGMANN    1,844,555
ADJUSTABLE BEARING FOR ROLL STRAIGHTENING MACHINES
Filed Jan. 23, 1925    2 Sheets-Sheet 2
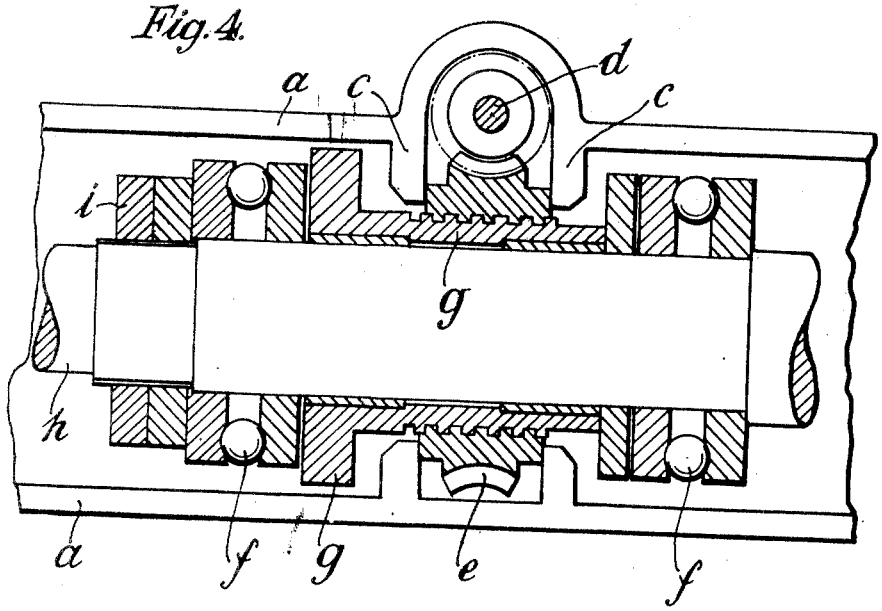
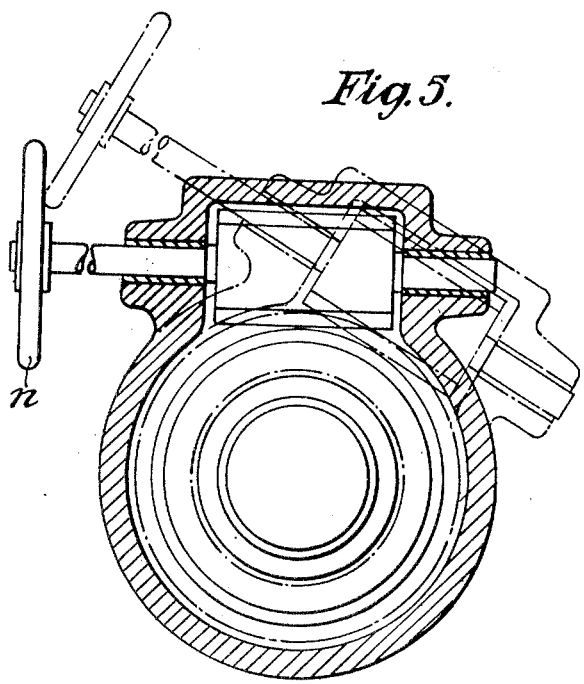
Inventor
P. Billigmann
by
W. E. Evans
Attorney.

Patented Feb. 9, 1932

1,844,555

UNITED STATES PATENT OFFICE

PETER BILLIGMANN, OF DUISBURG, GERMANY, ASSIGNOR TO DEUTSCHE MASCHINEN-FABRIK AKTIENGESELLSCHAFT, OF DUISBURG, GERMANY

ADJUSTABLE BEARING FOR ROLL STRAIGHTENING MACHINES

Application filed January 23, 1925, Serial No. 4,267, and in Germany March 17, 1924.

To render possible the ready straightening of material in roll straightening machines it is necessary to move the straightening rolls in the horizontal direction during working according to the profile of the material to be straightened.

Hitherto it has been the practice to adjust the rolls by providing nuts in front and to the rear of the actual straightening rolls, the nuts being adapted to render possible a change in the position of the straightening rolls in one direction or the other.

This construction has, however, the disadvantage that in order to effect an adjustment the machine had to be stopped and in addition the adjusting nuts, more particularly of the intermediate rolls, are very difficult of access.

It is further known to adjust the position of the whole straightening roll shaft by means of adjusting devices provided in the driving standards. This, however, has the effect of rendering the supervision of the machine very difficult, as the operator, who must keep the straightening rolls constantly in view, is compelled to pass right round the whole machine to effect the necessary movements.

According to the present invention these disadvantages are avoided in that, upon each of the shafts carrying the straightening rolls and between the two standards of the machine, a horizontally movable part such as an adjusting sleeve or the like is provided, by moving which, in one direction or the other, the whole shaft may be adjusted to a determined extent. The adjusting sleeve is advantageously disposed between the thrust bearings of the shafts and it is provided with a screw thread by which it can be moved in the horizontal direction by means of a worm gear.

It is, furthermore, advantageous to mount the worm gear in a sleeve fitted in between the pedestal body of the front and rear standard, this sleeve being made according to the invention as a split casing adapted to surround the thrust bearings and the driving shaft.

By this means the straightening rolls may be readily adjusted with great exactness and in the simplest manner. The hand wheels for moving the shafts independently may be arranged in such manner that the operator is able quite easily to move the separate shafts in the horizontal or axial direction according to the amount of deflection of the rod being fed into the machine, without being obliged to leave his place and without losing supervision of the machine. Furthermore, the thrust bearings are provided in a completely closed-in casing filled with grease, whereby the life of the bearings is lengthened and the cost of maintenance is reduced.

One construction of the apparatus according to the invention is illustrated, by way of example, in the accompanying diagrammatic drawings, in which Figure 1 is a longitudinal section through a shaft of a roll straightening machine;

Figure 4 is a longitudinal section of the thrust bearings and adjusting mechanism, to an enlarged scale, and Figure 5 is a cross-sectional view corresponding to Figure 4.

A divided sleeve $a$ is fitted in between the bearings $b^1$ in the front and rear standards $b$. The sleeve $a$ is provided with projections or shoulders $c$ between which the worm wheel $e$ is guided, which projections or shoulders prevent the worm wheel from moving axially upon rotation of the worm $d$ which engages in the worm wheel $e$ and which is mounted in the sleeve $a$.

The bore of the worm wheel $e$ is screw threaded and the thread engages with a corresponding thread on the adjusting sleeve $g$ provided between the thrust bearings $f$. One thrust bearing abuts against a collar or part of enlarged diameter on the shaft $h$, whilst the other is held on the shaft by the nuts $i$. By these means the adjusting sleeve is restrained from longitudinal movement upon the roll shaft. It is also maintained from rotation upon the said shaft by means carried by the bearing sleeve and consisting, for example, of a screw or pin in the bearing sleeve engaging a longitudinal groove or slot in the outer periphery of the adjusting sleeve.

Figure 1:
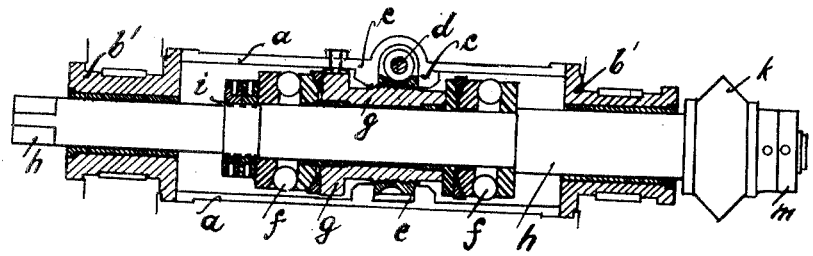
Figures 2, 3:
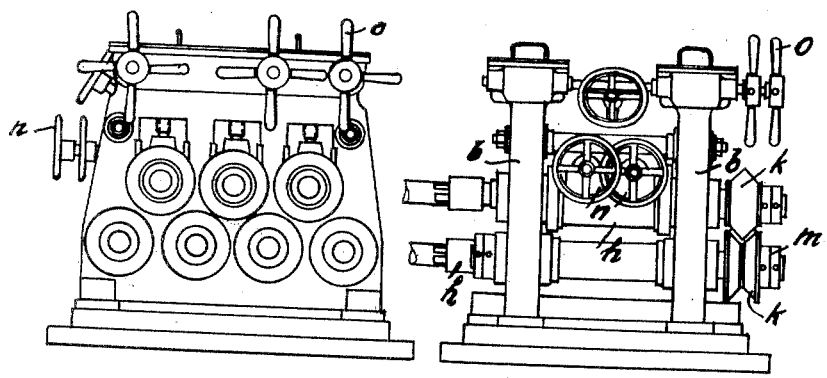
Figure 2 shows the roll straightening machine in elevation, to a reduced scale.
Figure 3 is a side elevation corresponding to Figure 2.

The straightening rolls $k$ are held upon the shaft by nuts $m$. The hand wheels $n$ for effecting axial movement are arranged between the standards, whilst the shafts are adjusted vertically in known manner by means of the hand wheel $o$. In the machine illustrated in Figures 2 and 3, three adjustable shafts $h$ are provided. The worm shafts and hand wheels $n$ for the left hand and middle adjustable shafts $h$ (Figure 2) are conveniently provided side by side, while the worm shaft for the right hand adjustable shaft $h$ is set at an inclination to position the corresponding hand wheel $n$ above the hand wheels before referred to.

The operation of the mechanism will be readily understood.

If the shaft, and therefore also the straightening roll, is to be moved, the worm wheel $e$ is rotated by means of the hand wheel $n$ through the intermediary of the worm. By this means the adjusting sleeve $g$ is moved axially and carries the straightening shaft with it.

I claim:—

1. Mechanism for effecting the axial adjustment of the roll shafts of roll straightening machines, comprising two standards in which said roll shafts are supported, and for each roll shaft a non-rotatable sleeve positioned between said standards and in which the said roll shaft is rotatably disposed, a thrust bearing at each end of the sleeve in fixed relation to said roll shaft and confining said sleeve, a worm wheel embracing said sleeve and engaging with a screw thread formed externally upon the said sleeve, a worm engaging with and adapted to rotate the said worm wheel upon the said sleeve, means for the manual operation of said worm and an enclosing sleeve disposed between and supported by the said standards and serving to hold the said worm wheel immovable axially and to carry the corresponding worm, substantially as hereinbefore described.

2. Mechanism for effecting the axial adjustment of the roll shafts of roll straightening machines, comprising two standards in which said roll shafts are supported, and for each roll shaft a non-rotatable sleeve positioned between the said standards and in which the said roll shaft is rotatably disposed, a thrust bearing at each end of the sleeve in fixed relation to the said roll shaft and confining the said sleeve, a worm wheel embracing the said sleeve and engaging with a screw thread formed externally upon said sleeve, a worm engaging with and adapted to rotate the said worm wheel upon the said sleeve, means for the manual operation of the said worm and a divided sleeve extending between the said standards and supported thereby for enclosing the said externally screw threaded sleeve and the worm wheel, the said divided sleeve having projections thereon which engage the respective sides of the worm wheel to hold it immovable axially, the said divided sleeve being also adapted to contain the worm and to carry the spindle of the worm, substantially as hereinbefore described.

PETER BILLIGMANN.